F. THORNTON, Jr.
THERMOSTAT SYSTEM.
APPLICATION FILED OCT. 2, 1914.

1,335,139.

Patented Mar. 30, 1920.

WITNESSES:

INVENTOR
Frank Thornton Jr.
BY
ATTORNEY

UNITED STATES PATENT OFFICE.

FRANK THORNTON, JR., OF PITTSBURGH, PENNSYLVANIA, ASSIGNOR TO WESTINGHOUSE ELECTRIC AND MANUFACTURING COMPANY, A CORPORATION OF PENNSYLVANIA.

THERMOSTAT SYSTEM.

1,335,139.   Specification of Letters Patent.   Patented Mar. 30, 1920.

Application filed October 2, 1914. Serial No. 864,551.

*To all whom it may concern:*

Be it known that I, FRANK THORNTON, Jr., a citizen of the United States, and a resident of Pittsburgh, in the county of Allegheny and State of Pennsylvania, have invented a new and useful Improvement in Thermostat Systems, of which the following is a specification.

My invention relates to thermostatic systems for electric circuit control, and it has for its object to provide a system of the character indicated that shall be simple in construction and arrangement, rapid and certain in operation, and capable of being operated without the use of an auxiliary source of current.

The regulation of electric circuits for the purpose of obtaining constant temperatures is frequently accomplished by the use of thermostatic expansion members. Relative motion between two points is caused by the unequal expansion and contraction of the different materials composing the thermostat, and the rate of this motion, which is approximately in direct proportion to the rate of temperature change, is very slow, under ordinary circumstances. If the movement of the thermostat is relied upon to close and to separate electric contact members, destructive arcs are likely to be drawn when the contact members are slowly separated, and, for this reason, it has heretofore been necessary to dispose the thermostatically operated contact members in a separately-energized control circuit carrying current at very low voltage.

According to my present invention, I provide a control circuit which includes a thermostat and which is energized directly from the main supply circuit, and I avoid destructive arcing between the contact members operated by the thermostat by providing separate means for interrupting the control circuit while the contact members are in engagement, so that the thermostat operates to close the control circuit, but never interrupts it.

Figure 1:
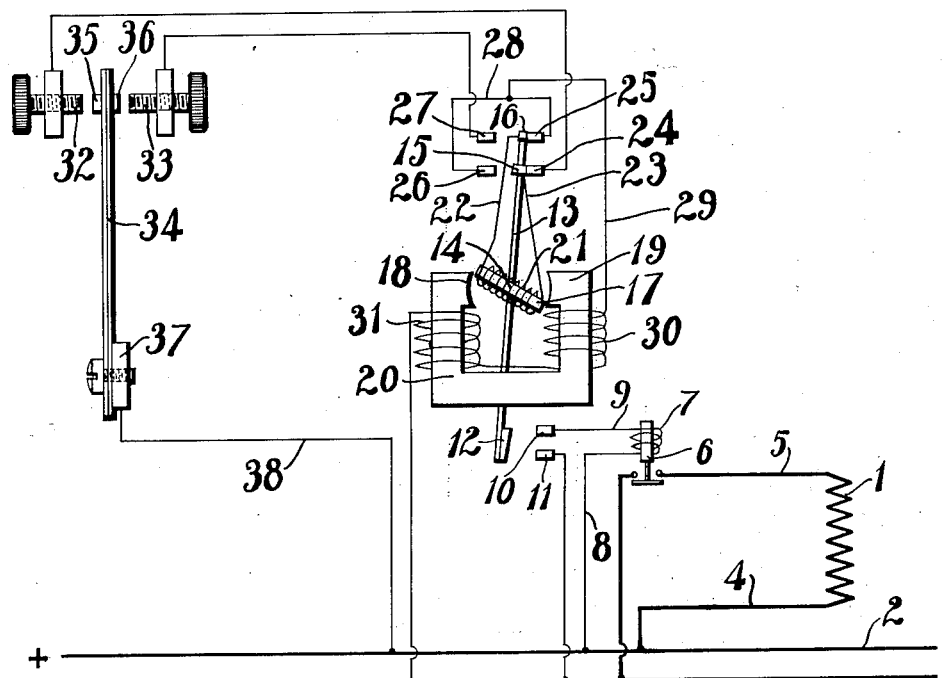
Figure 2:
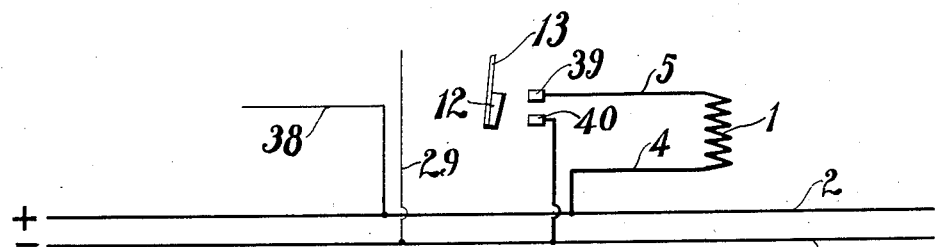

For a better understanding of my invention, reference may now be had to the accompanying drawing, in which Figure 1 is a diagrammatic view showing a control system embodying my invention, and Fig. 2 is a fragmentary diagrammatic view showing a modified form of a portion of the system illustrated in Fig. 1.

Referring to Fig. 1, a current-consuming device 1, which may be an electric heating device or other apparatus in which it is desired to control the flow of current in proportion to temperature variations, is supplied with current from main conductors 2 and 3 through supply conductors 4 and 5. A relay 6 is interposed in the conductor 5, and the flow of current in the current-consuming device is therefore interrupted when the relay 6 is opened and permitted to flow when the relay is closed. The relay 6 is operated by means of a solenoid coil 7, the terminals of which are connected across the main conductors 2 and 3 by means of conductors 8 and 9, the conductor 9 being provided with spaced contact members 10 and 11 which are adapted to be connected by a relay contact member 12. The contact member 12 is secured to a swinging support 13, which is pivoted at 14 and which carries, at its end opposite to the contact member 12, two spaced contact members 15 and 16. The support 13 may either be of insulating material or it may be provided with insulating means for supporting the various contact members which it carries. Pivoted at 14, and movable with the swinging support 13, is an armature core 17 that is adapted to oscillate between the opposed pole pieces 18 and 19 of an electromagnet 20. The core 17 is surrounded by a coil 21, the terminals 22 and 23 of which are connected to the contact members 15 and 16, respectively. Disposed at one side of the support 13, near its upper end, are stationary contact members 24 and 25 which are adapted to be engaged by the contact members 15 and 16, respectively. Similar stationary contact members 26 and 27 are disposed opposite the contact members 24 and 25. The arrangement of the contact members is such that, when the parts are in the positions shown in the drawing, the contact members 15 and 16 engage the contact members 24 and 25, thus establishing electric connection between the contact members 24 and 25 through the armature coil 21, and that the contact members 11 and 12 are disconnected. When the support 13 swings in a counter-clockwise direction about the pivot 14, the contact members 15 and 16 will connect the contact members 26 and 27 through the armature coil 21, and the contact member 12 will connect the contact members 10 and 11. The contact members 25 and 26 are connected to each other by means of a conductor 28, and the conductor 28 is connected to the main conductor 3 by means of a conductor 29 in which is inserted, in series relation, the coils 30 and 31 of the electromagnet 20.

The contact members 24 and 27 are respectively connected to adjustable contact members 32 and 33, between which is disposed the free end of a thermostatic element 34, which, as shown, is a bimetallic couple. The thermostat 34 is provided, near its free end, with contact members 35 and 36, which are adapted to engage the adjustable contact members 32 and 33, respectively, and is secured, at its other end, to a terminal block 37 which is connected, by means of a conductor 38, to the main supply conductor 2. Other types of thermostats may be readily substituted for the bimetallic couple 34, the contact members 32 and 33 being correspondingly arranged, so that the control circuit is completed through each of them at a predetermined temperature.

The modified system shown in Fig. 2 differs from that shown in Fig. 1 in that the relay 6 is omitted, relay contact members 39 and 40 being interposed directly in the conductor 5. These contact members 39 and 40 are adapted to be connected by means of a contact member 12, as in the first modification.

In the operation of the foregoing system, the thermostat 34 and its coöperating contact members are so proportioned and adjusted that the contact member 35 engages the contact member 32 when the heat of the surrounding medium falls below a predetermined point. Electric connection is thereby established in the control circuit through the contact member 24, armature coil 21, contact member 25, conductors 28 and 29 and coils 30 and 31. The coils 21, 30 and 31 are so wound that when the circuit is completed in the manner just described, the armature 17 will be caused to rotate in a counter-clockwise direction about the pivot 14, carrying with it the support 13 and thereby separating the contact members 15 and 16 from the contact members 24 and 25 and bringing the first-named contact members into engagement with the contact members 26 and 27. The same movement of the rod 13 causes the contact member 12 to close the solenoid circuit which energizes the relay 6, and current is thereby permitted to flow through the current-consuming device 1. It will be observed that the control circuit which was completed by the engagement of the contact members 32 and 35 has been interrupted, and therefore, when the thermostat 34 becomes heated and bends sufficiently to withdraw the contact member 35 from the contact member 32, no arc will be drawn between these contact members.

A further heating of the thermostat 34 will cause it to bring the contact members 33 and 36 into engagement, thus energizing the control circuit again and permitting current to flow through the contact members 27 and 16, armature coil 21, contact members 15 and 26, conductors 28 and 29, and coils 30 and 31. Since the current in the coils 30 and 31 is flowing in the same direction as before, while the current in the armature coil 21 is flowing in the reverse direction, the armature core 17 will be caused to rotate in a clockwise direction, thus breaking the circuit which operates the relay 6 and interrupting the current in the main heating circuit. By this clockwise rotation of the armature core 17, the contact members 15 and 16 are brought again into engagement with the contact members 24 and 25, thus completing the cycle of operations.

It is to be particularly noted that no auxiliary source of low-voltage current supply is necessary in the system described above, the breaking of the control circuit by the oscillating contact members 15 and 16 being sufficiently rapid to prevent arcing in this circuit.

The arrangement shown in Fig. 2 may be adopted when the power in the conductor 5 is not sufficiently great to cause destructive arcing between the contact member 12 and the contact members 39 and 40.

While my invention is particularly adaptable to electric heating apparatus, it is to be understood that it may also be employed for regulating other electric circuits in proportion to temperature changes. It is also to be understood that my system may be variously modified by persons skilled in the art to which my invention appertains, and that my invention comprehends all such modifications as fall within the scope of the appended claims.

I claim as my invention:

1. A thermostat system for electric circuit control comprising a control circuit, a thermostat, contact members adapted to be operated by the said thermostat to close the said control circuit, means comprising an oscillatory contact-making wound armature for interrupting the said control circuit while the said contact members are in engagement, a magnet for actuating the said armature and means for reversing the connections for supplying energy to the said armature, the said reversing means being operable at each oscillation of the said armature.

2. A thermostat system for electric circuit control comprising a relay, a control circuit for energizing the said relay, a thermostat, contact members adapted to be operated by the said thermostat to close the said control circuit, and means comprising a stationary electromagnet having a constant polarity and an oscillatory contact-making, wound-armature member for interrupting the said control circuit while the said contact members are in engagement.

3. A thermostat system for electric circuit control comprising a relay, a contact-making wound armature, an electromagnet adapted to operate the said armature, a control circuit for energizing the said relay and the said magnet, a thermostat, contact members adapted to be operated by the said thermostat to close the said control circuit, and other contact members in the said control circuit adapted to be operated by the movement of the said relay to open the said control circuit, and to reverse the connections for supplying energy to the said wound armature.

4. A thermostat system for electric circuit control comprising a relay, a control circuit for energizing the said relay, a thermostat, means controlled by the said thermostat for closing the said control circuit to operate the said relay, and means comprising a stationary electromagnet having a constant polarity and an oscillatory wound armature and contact members associated with the said armature and coöperating with fixed contact members in the said control circuit for interrupting the said control circuit while the first-named contact members are closed.

5. A thermostat system for electric circuit control comprising a relay contact member, a pivoted support for the said contact member, an armature adapted to oscillate in unison with the said support, a field magnet associated with the said armature, a thermostat, and means controlled by the said thermostat for causing current to pass through the said armature in one direction at a pretermined temperature and for causing current to pass through the said armature in the opposite direction at another predetermined temperature.

6. A thermostat system for electric circuit control comprising a relay contact member, a pivoted support for the said contact member, an armature adapted to oscillate in unison with the said support, a field magnet associated with the said armature, contact members secured to the said pivoted support and electrically connected to the terminals of the said armature, a control circuit, opposed pairs of fixed contact members of opposite polarity in the said control circuit adapted to coöperate with the last-named contact members on the said pivoted support, a thermostat, and means operated by the thermostat for closing the said control circuit at predetermined temperatures.

7. A thermostat system for electric circuit control comprising a stationary electromagnet having a constant polarity, a pivotally mounted arm, an armature carried by said arm having a magnetizing winding, a switch member carried by said arm for effecting the reversal of the connections of said winding, and a second switch member carried by said arm.

8. A thermostat system for electric circuit control comprising a stationary electromagnet having a constant polarity, a pivotally mounted arm, an armature carried by said arm having a magnetizing winding, a switch member carried by said arm for controlling an electrical circuit, and means operable by said arm for effecting the reversal of the connections of said winding upon each operative movement of said arm.

9. A thermostat system for electric circuit control comprising a stationary electromagnet having a constant polarity, a pivotally mounted arm, an armature carried by said arm having a magnetizing winding, a switch member carried by said arm for effecting the reversal of the connections of said winding, a second switch member carried by said arm, and a thermostat for controlling the circuit of said winding.

10. A thermostat system for electric circuit control comprising a stationary electromagnet having a constant polarity, a pivotally mounted arm, an armature carried by said arm having a magnetizing winding, a switch member carried by said arm for effecting the reversal of the connections of said winding, a second switch member carried by said arm, a thermostat for controlling the circuit of said winding, said reversing switch member being operable to open the circuits controlled by said thermostat while the latter is in operative position.

11. A thermostat system for electric circuit control comprising a stationary electromagnet having a winding adapted to produce a constant polarity, a pivotally mounted arm, an armature carried by said arm and having a magnetizing winding associated with said electromagnet, a switch member carried by said arm on one side of said armature winding for effecting the reversal of the connections of said winding, and a second switch member carried by said arm on the other side of said armature winding.

In testimony whereof, I have hereunto subscribed my name this 23rd day of Sept., 1914.

FRANK THORNTON, Jr.

Witnesses:
E. LYLE POWELL,
B. B. HINES.